Sept. 26, 1961     M. AMIRAULT ET AL     3,001,807
SEALING DEVICES BETWEEN A ROTATING PART AND A FIXED PART
Filed July 31, 1957                                         2 Sheets-Sheet 1
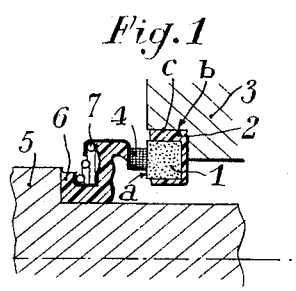
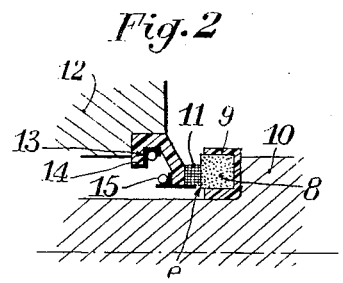
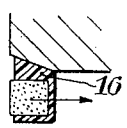
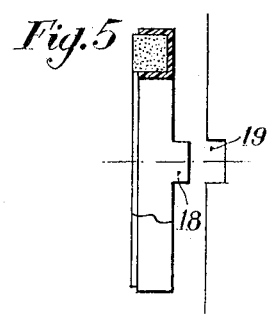
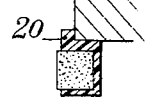
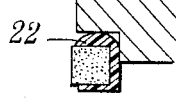
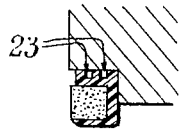
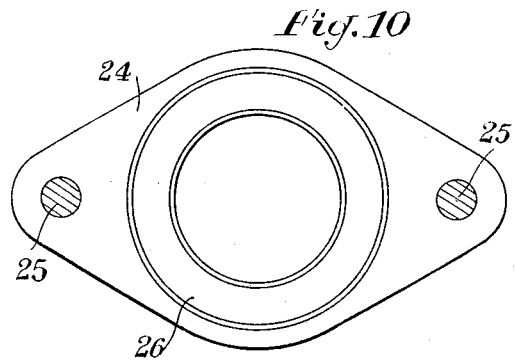

United States Patent Office 3,001,807
Patented Sept. 26, 1961

3,001,807
SEALING DEVICES BETWEEN A ROTATING PART AND A FIXED PART
Maxime Amirault, 4 Impasse des Saubergeaux, Antony, France, and Paul Destoumieux, 46 Blvd. Inkermann, Neuilly-sur-Seine, France
Filed July 31, 1957, Ser. No. 675,313
Claims priority, application France Aug. 6, 1956
1 Claim. (Cl. 286—11)

This invention relates chiefly to sealing devices used between a rotating part and a fixed part commonly called "Mechanical sealing devices with side friction" or again "with axial or frontal friction."

These joints generally comprise a friction ring connected with one of the parts, movable or fixed, through the medium of a diaphragm of elastic material, and pushed against another friction ring, associated with the other part; these two parts may be, for instance, one of them a casing and the other one the shaft which rotates inside said casing. One of these rings is constituted, in general, by a material having a low friction coefficient, such as: agglomerated graphite, sintered bronze, etc., and the other part by a metallic material, for instance: cast iron, steel, bronze, etc. Now there are found commonly, in cases of operation in water or corrosive materials, sticking phenomena which weld the two rings to each other during the stopping period, to such an extent that it is necessary to apply a considerable effort for separating them, a stress which, according to experience, may be 10 to 30 times or more larger than the normal friction torque but experience shows that the use of ceramic materials such as: porcelain, steatite, in the presence of graphite bearing materials, does not cause any of these sticking phenomena. These materials remain unattacked in most media and are very resistant to wear. These very interesting properties are counter-balanced by the cost which is relatively high, due to the difficulties of the machining which is necessary at some points, the shrinking undergone during baking deforming the parts very irregularly.

The main object of the present invention is to reduce to a minimum the portions of the friction ring to be machined, while, at the same time, cutting down its cost to an extent which is particularly substantial in case that friction ring is made out of a material of a ceramic nature.

To that effect, the joint between the rotating portion and the fixed portion according to the invention is characterized in that one of the friction rings, made of a material which may be particularly of a ceramic nature, is coated, outside its friction face, with an elastic material which ensures it the required shape and accurate dimensions.

This combination makes it possible to reduce the machining to that of the friction face, the other regions of the surface of the coated ring, for instance the bore or the peripherial surface, being formed by the added material. Further, some of these latter regions allow the securing to one of the two parts, fixed or mobile, between which the joint is to be interposed, for instance by a snug fitting on the shaft or inside the casing or again a securing by any other means such as glands, gluing, straps or the like.

For a better understanding of the invention and by way of example only, a few forms of embodiment are described hereinafter with reference to the appended drawings wherein:

FIGURE 1 represents a sealing device in which a friction ring of ceramic material is connected with the casing by forcing it into a groove.

FIGURE 2 shows another sealing device in which a ceramic ring is connected with a rotating shaft in the same manner.

FIGURES 3 to 10 represent ceramic friction rings in which the moulded material which coats them has various shapes.

Figure 11:
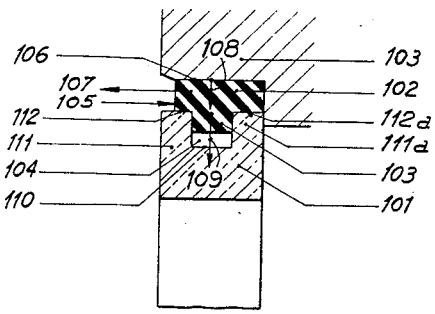
FIGURES 11 to 13 represent ceramic friction rings, with a non-moulded coating on said ceramic ring, and consisting of an added ring of dense and compact elastic material.

The joint represented in FIGURE 1 comprises, on the one hand, a friction ring 1 of ceramic material in which the face $a$ stands perpendicularly to the axis and the peripheral face $b$ coated by an elastic or plastic material 2, rubber like, having a cylindrically shaped peripheral surface, said peripheral surface of the coating being fitted into the bore $c$ of the casing 3, on the other hand a movable portion of the joint, of a conventional shape, comprising a friction ring 4 which may be made of agglomerated graphite, connected with a shaft 5 through the medium of a rubber diaphragm 6 and pushed by a spring 7 bearing against a shoulder associated with the shaft.

According to the modified embodiment shown in FIGURE 2, the joint consists, on the one hand, of a friction ring of ceramic material 8 carrying a face $e$ standing perpendicularly to the axis, and the other faces of which comprise a lining 9 of elastic or plastic material, rubber-like, forced on the shaft and bearing on the shoulder 10 associated with the shaft, and, on the other hand, of a conventional joint device with a friction ring 11 connected with the casing 12 through a diaphragm 13 and pushed by a spring 15 which bears on a ring 14 associated with the periphery of the diaphragm.

It should be understood that the movable elements of the joints described above diagrammatically, are shown only to facilitate the understanding of the invention and that they may be of any other type having an axial thrust.

The ceramic friction ring shown in FIGURE 3 comprises a cone-shaped plastic material coating 16, for allowing an easy wedging inside a bore; in the modified embodiment shown in FIGURE 4 the coating 17 has a conical inner bore for allowing its fastening by an easy wedging on a male cone; in that of FIGURE 5 the coating, on the side opposite the friction face, bears driving studs 18 which can be housed in screw-type slots 19; in that of FIGURE 6, the coating comprises, outside, a shoulder 20 for limiting its entering in a bore; in that of FIGURE 7, the coating comprises a web 21 for limiting the forcing on the end of a shaft; in that of FIGURE 8, the coating has an arcuate section 22 to make easier the forcing into a bore; in that of FIGURE 9 the coating comprises grooves 23 for ensuring a better sealing.

FIGURE 10 illustrates a manner in which the ceramic ring may be fastened on the peripheral edge of a circular aperture opening directly, that is, without any projection or shoulder, into a plan face, for example as shown in FIG. 6. In this type of fixation for the ceramic ring the rear portion of the lining of the friction ring 26 is formed with an extension surrounding this ring to form a flange 24 adapted to be clamped or pressed against the plan face surrounding the circular aperture and kept in position thereagainst by screws or bolts 25.

The present invention also contemplates a coating, not moulded on the ceramic ring. That coating may be made out of a highly flexible rubber like elastic material, for instance spongy, or again it is provided with circular ribs on the inner or outer face of the forcing diameter so as to impart it a sufficient flexibility for absorbing dimensional variations due to the irregularities in the shrinkage of the ceramic.

Figure 12:
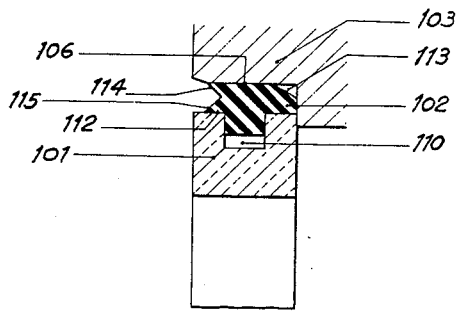
Figure 13:
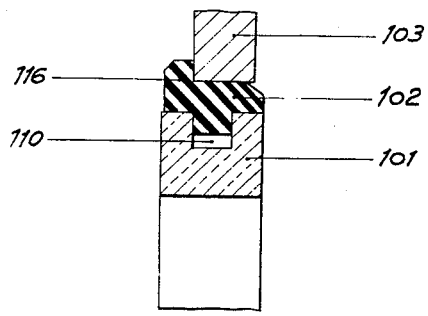

In another form of embodiment shown in FIGURES 11 to 13 the coating consists of a ring of a dense and compact elastic material added around the ceramic ring, a sufficient elasticity of said ring being obtained by means of special shapes conjugate with those of the ceramic ring.

The joint according to FIGURE 11 comprises a ceramic friction part 101 and a rubber ring 102. The two parts are assembled by means of a circular rib carried by the bore in the part 102 and engaged in a circular groove 104 cut into the periphery of part 101. This assembly allows a positive associating between the two parts in the axial direction. In addition, the elastic ring 102 acquires its radial flexibility, for the forcing in, as follows: under the axial thrust, for the forcing in, of a tool placed in principle at point 105, the rubber ring for re-entering its cylindrical housing 106 provided in the part 103 tends to move axially along the arrow 107, while decreasing substantially in thickness, while in the radial direction, along the arrows 108 and 109 the groove 104 of the ceramic ring being designed with a smaller diameter than that of the rubber rib, the material is forced back into the space 110 remaining free around the bottom of the groove. Experience shows that if that free space does not exist, the side walls 111 and 111a are liable to burst, unless they offer a very large cross section, which makes the part undesirably bulky.

It will be seen that in this arrangement, it is not necessary when making the coating, to use a sponge rubber to be able to withstand the differences or variations in dimensions in the ceramic material. For obtaining an accurate tightening, it is sufficient to true the cylindrical portion 112 and 112a on which the rubber is bearing.

Wtihout departing from the spirit of the invention, rubber rings of different shapes may be obtained. It will be seen, notably in the arrangement shown in FIG. 11, that the intermediate region of the elastic ring 102 is easily obtained by forcing its material into the groove 104. However, the same does not apply to the lateral edges of this ring 102 which are compressed with a substantial force between the ends of the cylindrical recess 106 and the cylindrical peripheries 112, 112a of the ceramic friction ring 101 which can "flow" back only longitudinally. In the forms of embodiment shown in FIGS. 12 and 13 this compression of the lateral edges of the elastic ring is strongly reduced or even eliminated. In FIG. 12 this condition is obtained by reducing the radial thickness of these two lateral edges. The lateral edge which is to be engaged first into the cylindrical recess 106 is formed to this end with a bevel 113 and the other lateral edge has a V-sectioned circular groove formed in its annular end face to divide this other lateral edge into two lips 114, 115 engaging the cylindrical portion 112 and the cylindrical recess 106, respectively, as shown. In FIGURE 13 the ring 102 offers, on the side opposite the forcing-in a rim 116 serving as an axial stop for the ceramic-rubber assembly. This edge is free to expand radially like the opposite edge formed with a bevel similar to that formed on the elastic ring 102 of FIG. 12.

The rubber ring could also offer on both sides of its outer contour two rims protruding radially for engaging it on both sides of the inner contour of part 103.

What we claim is:

A seal between a fixed part and a part rotatable about an axis, which comprises a first friction ring rigid with one of said parts and having a plane, annular friction face perpendicular to said axis, a second friction ring, flexible means causing said second friction ring to be rotatably fast and in sealing engagement with the other of said parts, said second friction ring having a plane, annular friction face perpendicular to said axis, means bearing on said other part and exerting an elastic axial thrust against said second friction ring to urge said second friction ring towards said first friction ring and to cause the two annular friction faces of said friction rings to engage each other with a sealing frictional relative engagement, said first part having a cylindrical recess formed therein to a predetermined diameter for receiving said first friction ring, said first friction ring comprising a rigid annular element carrying said annular friction face on its front side and being bound at its periphery by a cylindrical surface of a diameter smaller than that of said cylindrical recess of said first part, said cylindrical surface having a circular groove formed therein down to a predetermined diameter, and a ring member of elastic material formed with an inner radial extension having an inner diameter greater than that of said circular groove, said ring of elastic material being secured to said rigid annular element by resiliently forcing said inner radial extension of said ring of elastic material into said circular groove of said rigid annular element, said first friction ring being fastened to said first part by resiliently forcing said ring of elastic material into the cylindrical recess of said first part.

References Cited in the file of this patent

UNITED STATES PATENTS

| | | |
|---|---|---|
| 423,337 | McManus | Mar. 11, 1890 |
| 2,423,771 | Gould | July 8, 1947 |
| 2,536,623 | Brown | Jan. 2, 1951 |
| 2,593,410 | Buckendale | Apr. 22, 1952 |
| 2,646,296 | Destoumieux et al. | July 21, 1953 |
| 2,650,841 | Meyer | Sept. 1, 1953 |
| 2,814,513 | Kupfert et al. | Nov. 26, 1957 |
| 2,873,127 | Pratt | Feb. 10, 1959 |

FOREIGN PATENTS

| | | |
|---|---|---|
| 128,780 | Sweden | July 11, 1950 |
| 695,087 | Great Britain | Aug. 3, 1953 |